Figure 1:
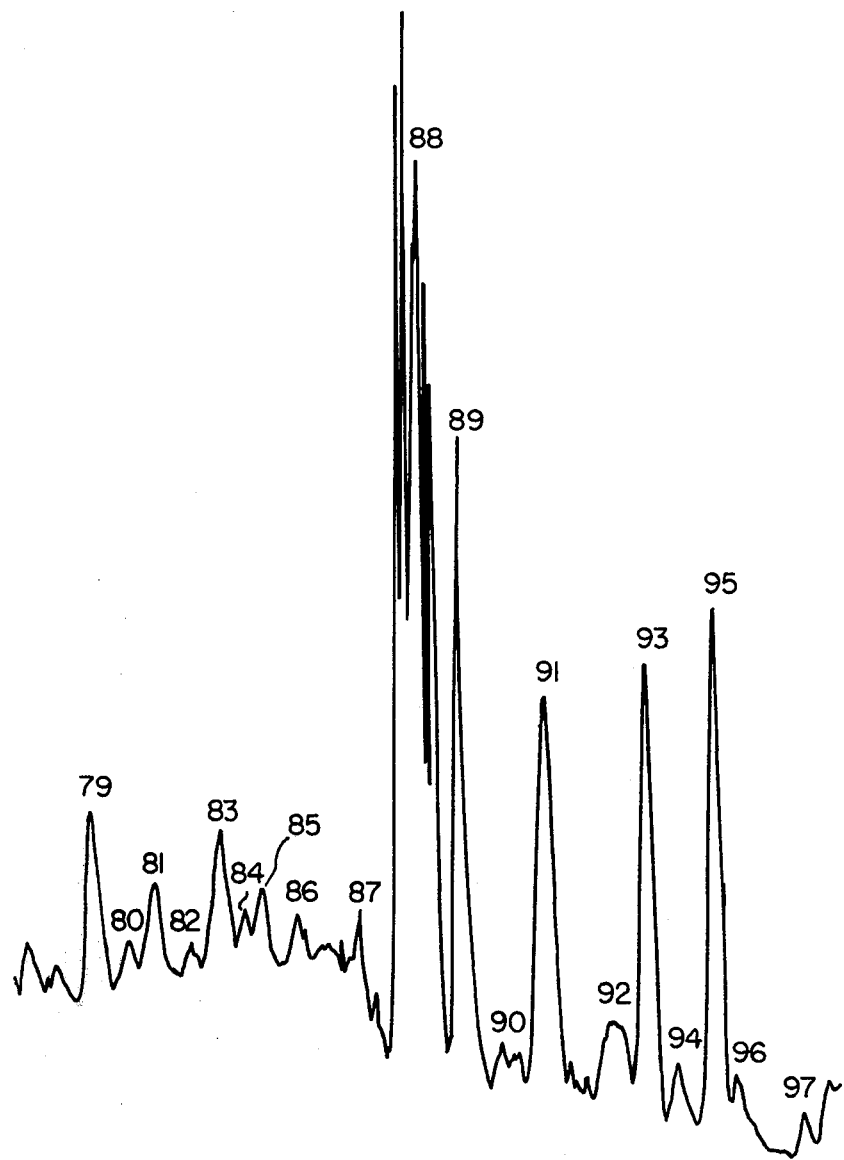

United States Patent [19]

Wilson et al.

[11] 3,966,988

[45] June 29, 1976

[54] FLAVORING COMPOSITIONS AND PROCESSES UTILIZING DITHIAZINE COMPOUNDS

[75] Inventors: Richard Arnold Wilson, Westfield; Ira Katz, West Long Branch; Manfred H. Vock, Locust, all of N.J.; Edward J. Shuster, Brooklyn, N.Y.

[73] Assignee: International Flavors & Fragrances Inc., New York, N.Y.

[22] Filed: July 8, 1975

[21] Appl. No.: 594,099

Related U.S. Application Data

[63] Continuation-in-part of Ser. No. 166,683, July 28, 1971, abandoned.

[52] U.S. Cl.............................. 426/535; 252/522; 131/17 R
[51] Int. Cl.²......................................... A23L 1/231
[58] Field of Search............................ 426/535, 533; 260/243 R, 327 T

[56] References Cited
UNITED STATES PATENTS

| | | | |
|---|---|---|---|
| 2,213,804 | 9/1940 | Lincoln et al................ | 260/327 UX |
| 2,594,379 | 4/1952 | Barck................................ | 426/533 |

OTHER PUBLICATIONS

Chem. Abstracts, vol. 44, 1950, 16952c, Abstracting Food Research 15, 322–5 (1950).

Pippen et al., Hydrogen Sulfide, A Direct and Potentially Indirect Contributor to Cooked Chicken Aroma, J. Food Science, 34 (1969), pp. 443–446.
Bedoukian, Progress in Perfumery Materials, *Cosmetics and Perfumery*, vol. 88, Apr. 1973, p. 31.

*Primary Examiner*—Joseph M. Golian
*Attorney, Agent, or Firm*—Arthur L. Liberman; Harold Haidt; Franklin D. Wolffe

[57] ABSTRACT

A small but effective amount of a compound represented by the formula

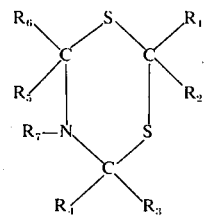

wherein $R_1$, $R_3$, and $R_5$ are the same and are lower alkyl of from 1 to 5 carbon atoms, $R_2$, $R_4$, and $R_6$ are hydrogen, and $R_7$ is hydrogen or lower alkyl of from 1 to 5 carbon atoms; is used to alter, modify or enhance the flavor and aroma characteristics of a consumable material, a foodstuff or a perfume or a perfumed article.

6 Claims, 4 Drawing Figures

EXAMPLE VII

G.L.C. SPECTRUM, PEAKS 79 - 97

I.R. SPECTRUM FOR EXAMPLE VII, Synthetic 2,4,6,-Trimethyldihydro-1,3,5-dithiazine

I.R. SPECTRUM FOR EXAMPLE VII, PEAK 88 OF EXTRACTED MATERIAL

FLAVORING COMPOSITIONS AND PROCESSES UTILIZING DITHIAZINE COMPOUNDS

This application is a continuation-in-part of U.S. application patent Ser. No. 166,683 filed on July 28, 1971 now abandoned.

THE INVENTION

This invention has to do with the use of certain dithiazines to alter, modify or enhance the flavor and aroma of consumable materials; foodstuffs, perfumes and perfumed articles.

The term "consumable material" includes foodstuffs and perfumed materials (e.g. perfumes, colognes, soaps and aftershave lotions).

The term "foodstuff" as used herein includes both solid and liquid ingestible materials for man or animals which materials usually do, but need not, have nutritional value. Thus, foodstuffs include meats, gravies, soups, convenience foods, malt and other alcoholic or non-alcoholic beverages, nut butters such as peanut butter and other spreads, seafoods including fish, crustaceans, mollusks and the like, candies, breakfast foods, baked goods, vegetables, cereals, soft drinks, snack foods, pet foods such as dog and cat foods, other veterinary products, and the like.

The terms "alter" and "modify" (in their application to foodstuffs) in its various forms will be understood herein to mean the supplying or imparting of a flavor character or note to an otherwise bland, relatively tasteless substance, or augmenting an existing flavor characteristic where the natural flavor is deficient in some regard, or supplementing the existing flavor impression to modify the organoleptic character.

The term "enhance" is used herein to mean the intensification of a flavor or aroma characteristic or note without the modification of the quality thereof. Thus, "enhancement" of a flavor or aroma means that the enhancement agent does not add any additional flavor note.

There is a continuing search for compositions which can vary, fortify, modify, enhance or otherwise improve (i.e. alter) the flavor and aroma of a foodstuff. To be fully satisfactory, such compositions should be stable, non-toxic, and blendable with other ingredients to provide their own unique flavor and aroma nuance without detracting from the co-ingredients. Preferably, such compositions should be naturally occurring or present in natural foodstuffs (although unrecognized as flavor components thereof) so that their ingestible safety can be readily recognized. Additionally, these materials should be capable of being synthesized in a simple and economic manner.

Various heterocyclic-poly-S-compounds have been shown in the literature to have flavor implications. For example, in U.S. Pat. No. 3,503,758 to Wada et al., pentathiepane, tetrathiane and tetrathiepane are said to have a flavor and aroma; and Chang in *Chemistry and Industry*, 1639, Nov. 23, 1968, reports 3,5-dimethyl-1,2,4-trithiolane as present in the volatiles of boiled beef. Other investigators have commented that poly alkyl trithianes are odorless or have an intensely putrid odor. See Barch, United States Letters Patent 2,594,379 and Breslav and Skolnik, "Heterocyclic Compounds", p. 726, *Interscience* (1966). Pippen in *Journal of Food Science*, 34, p. 443–446 (1969) speculated that $H_2S$ reacted with a carbonyl compound in chicken fat and postulated that 2,4,6-trimethyl-S-trithiane could be one of the products formed.

It has now been found that the flavor of a foodstuff can be altered by adding thereto a small but effective amount of at least one heterocyclic-poly-S-compound having the formula

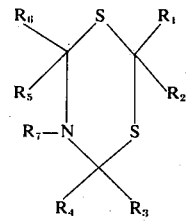

wherein $R_1$, $R_3$, and $R_5$ are the same and are lower alkyl of from 1 to 5 carbon atoms, $R_2$, $R_4$, and $R_6$ are hydrogen, and $R_7$ is hydrogen or lower alkyl of from 1 to 5 carbon atoms. The invention also contemplates flavoring compositions containing such heterocyclic-poly-S-compounds.

A particularly preferred class of such compounds includes the dithiazines of the formula

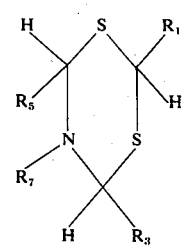

wherein $R_2$, $R_3$ and $R_5$ are the same lower alkyl radical of 1 to 5 carbon atoms and $R_7$ is hydrogen or a lower alkyl radical of 1 to 5 carbon atoms. Suitable dithiazines include 2,4,6-trimethyldihydro-1,3,5-dithiazine
2,4,5,6-tetramethyldihydro-1,3,5-dithiazine
2,4,6-tri-isopropydihydro-1,3,5-dithiazine
2,4,6-tri-n-butyldihydro-1,3,5-dithiazine
2,4,6-tri-isobutyldihydro-1,3,5-dithiazine
2,4,6-tri-n-pentyldihydro-1,3,5-dithiazine and mixtures thereof. The dithiazines have a pleasant sweet cereal, nutty taste and are especially suitable for beef, meat, nut and burnt flavors.

The structural formulae given herein contemplate and include cis- and trans- and other conformational isomers.

The dithiazines are prepared by using conventional processes, such as the methods shown in Beilstein, 27, pp. 460–462 and 2d Suppl., O. 524. Applicants have also found that the compound 2,4,6-trimethyldihydro-1,3,5-dithiazine is present in the diethyl ether extract of the volatiles of pressure cooked beef (See Example III). It has not been determined whether the dithiazine is originally present in the beef or is an artifact of isolation. Pertinent to the foregoing is the following literature:

1. Richard A. Wilson, et al., "Isolation and Identification of Some Sulfur Chemicals Present in Pressure-Cooked Beef" Reprinted from AGRICULTURAL AND FOOD CHEMISTRY, Vol 21, No. 5, Page 873, September/October 1973;

2. Ron G. Buttery, et al., "Characterization of Some Volatile Constituents of Dry Red Beans" J. Agric. Food Chem. 23(3):516–519 (1975); and
3. Henk W. Brinkman, et al., "Components Contributing to Beef Flavor Analysis of the Headspace Volatiles of Beef Broth" J. Agr. Food Chem. 20(2):177–181 (1972).

Such heterocyclic-poly-S-compounds are useful in flavoring compositions and to alter the flavor of foodstuffs. They are especially adapted for adding sweet, meaty and nut nuances to consumable materials and in rounding out and improving the character and quality of meat flavors.

When the heterocyclic-poly-S-compounds according to this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners and flavor intensifiers.

Such conventional flavoring materials include saturated and unsaturated fatty and amino acids, alcohols, including primary and secondary alcohols; esters, carbonyl compounds including ketones and aldehydes; lactones, other cyclic organic materials including benzene derivatives, alicyclics, heterocyclics such as furans, pyridines, pyrazines and the like; sulfur-containing materials including thiols, sulfides, disulfides and the like; proteins; lipids; carbohydrates; so-called flavor potentiators such as monosodium glutamate, guanylates, and inosinates; natural flavoring materials such as cocoa, vanilla and caramel; essential oils and extracts such as anise oil, clove oil and the like; artificial flavoring materials such as vanillin; and the like. Particularly useful flavoring agents and adjuncts are cyclopentane thiol, protein hydrolysate, such as hydrolyzed vegetable protein, cysteine, salts of cysteine such as cysteine hydrochloride, thiamine, salts of thiamine, 2,5-dimethyl-3-hydroxy-4-oxo-4,5-dihydrofuran, and products resulting from heating a mixture of at least two differing materials of the foregoing and high pressure (2–10 atmospheres) reaction products of $H_2S$ and 2,5-dimethyl-3-hydroxy-4-oxo-4,5-dihydrofuran.

Stabilizers include preservatives such as sodium chloride, and the like; antioxidants such as calcium and sodium ascorbate, ascorbic acid, butylated hydroxyanisole, butylated hydroxytoluene, propyl gallate and the like; sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches and pectins.

Surface active agents include emulsifying agents such as mono- and/or diglycerides of fatty acids such as caproic acid, caprylic acid, palmitic acid, myristic acid, oleic acid, and the like; lecithin; defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents such as sodium acetate, sodium diacid phosphate, ammonium bicarbonate, ammonium phosphate, citric acid, lactic acid, vinegar and the like; colorants such as carminic acid, cochineal, turmeric, curcumin, approved food and drug dyes, and the like; firming agents such as aluminum sodium sulfate, calcium chloride and calcium gluconate; texturizers; anti-caking agents such as aluminum calcium sulfate and tribasic calcium phosphate; enzymes, yeast foods such as calcium lactate and calcium sulfate; nutrient supplements such as iron salts, such as ferric phosphate, ferric pyrophosphate, ferrous gluconate and the like, riboflavin, vitamins; zinc sources such as zinc chloride, zinc sulfate, and the like.

The heterocyclic-poly-S-compounds, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The heterocyclic-poly-S-compounds can be incorporated with the carriers by conventional means such as spray-drying, drum drying, and the like. Such carriers can also include materials for coacervating the heterocyclic-poly-S-compounds (and other flavoring ingredients, as present) to provide encapsulated products. When the carrier is an emulsion, the flavoring composition can also contain emulsifiers such as mono- and diglycerides of fatty acids and the like. With these carriers or vehicles, the desired physical form of the composition can be prepared.

It will be understood by those skilled in the art that the heterocyclic-poly-S-compounds can be added to the materials to be flavored at any convenient point in the production of the finished product. Thus, when they are used to alter or otherwise vary the flavor of a foodstuff, they can be added in the original mixture, dough, emulsion, batter or the like, prior to any cooking or heating operation. Alternatively, they can be added at a later stage of processing if volatilization losses would be excessive during the earlier processing.

The quantity of heterocyclic-poly-S-compounds or mixtures thereof utilized should be sufficient to impart the desired flavor characteristic to the product, but on the other hand, the use of an excessive amount of the heterocyclic-poly-S-compounds is not only wasteful and uneconomical but in some instances too large a quantity may unbalance the flavor or other organoleptic property of the product to be consumed. The quantity used will vary depending upon the ultimate foodstuff or other consumable product; the amount and type of flavor initially present in the product; the further process or treatment steps to which the product will be subjected; regional and other preference factors; the types of storage, if any, to which the product will be subjected; and the preconsumption treatment, such as baking, frying, and so on, given to the product by the ultimate consumer.

It is accordingly preferred that the ultimate compositions contain from about 0.02 parts per million (ppm)

to about 100 ppm of the heterocyclic-poly-S-compounds. More particularly, in food compositions it is desirable to use from about 0.02 to about 20 ppm and in certain preferred embodiments of the invention, from about 0.1 to about 15 ppm of the heterocyclic-poly-S-compounds are included in the finished product.

The amount of heterocyclic-poly-S-compounds to be utilized in flavoring or flavor-enhancing compositions can be varied over a wide range depending upon a particular quality to be added to the foodstuff, tobacco, or other consumable material. Thus, amounts of one or more heterocyclic-poly-S-compounds according to the present invention from about 0.1 up to 80 or 90% can be incorporated in such compositions. It is generally found to be desirable to include from about 0.5 to about 25% of the heterocyclic-poly-S-compounds in such compositions.

The heterocyclic-poly-S-compounds of this invention can also be added to perfume compositions in their pure form or they can be added to mixtures of materials in fragrance-imparting compositions to provide a desired fragrance character to a finished perfume material. The perfume and fragrance compositions obtained according to this invention are suitable in a wide variety of perfumed articles and can also be used to improve, enhance, modify, alter or reinforce fragrance materials. It will thus be appreciated that the heterocyclic-poly-S-compounds and mixtures thereof of this invention are useful as olfactory agents and fragrances.

The term "perfume composition" is used herein to mean a mixture of compounds, including for example, natural oils, synthetic oils, alcohols, aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling, fresh-smelling materials. Such perfume compositions or the novel materials of this invention can be used in conjunction with carriers, vehicles, solvents, dispersants, emulsifiers, surface-active agents, aerosol propellants, and the like. In perfume compositions, the individual components contribute their particular olfactory characteristics, but the overall effect of the perfume composition will usually at least be the sum of the effect of each ingredient. Thus, the heterocyclic-poly-S-compounds of this invention can be used to alter the aroma characteristics of a perfume composition, for example, by highlighting or moderating the olfactory reaction contributed by another ingredient of the composition.

The amount of one or more compounds of this invention which will be effective in perfume compositions depends on many factors, including the other ingredients, their amounts and the effects which are desired. It has been found that perfume compositions containing as little as 1.0% by weight of the compounds of this invention, or even less can be used to intensify or augment and enhance various types of fragrance compounds, the odors of which may be desired to be imparted to colognes, perfumes, bath oils and other cosmetic products. The amount employed will depend on considerations of cost, nature of the end product, the effect desired in the finished product, and the particular fragrance sought. Higher concentrations (e.g. 2% by weight) of the heterocyclic-poly-S-compounds of this invention will intensify the green leafy note and green nutty notes of the compositions.

The heterocyclic-poly-S-compounds disclosed herein can be used in a composition as an olfactory component of a fragrance which in turn can be used in perfumes, colognes, bath preparations (such as bath oils and bath salts) and the like. When the heterocyclic-poly-S-compounds of this invention are used in finished perfumed articles, such as the foregoing, they can be used in amounts of 0.04% by weight or lower.

The following examples are given to illustrate embodiments of the invention as it is presently preferred to practice it. It will be understood that these examples are illustrative, and the invention is not to be considered as restricted thereto except as indicated in the appended claims.

All parts, proportions, percentages, and ratios herein are by weight unless otherwise indicated.

EXAMPLE I

The following materials are homogeneously mixed at 25°C:

| INGREDIENTS | PARTS |
|---|---|
| Vegetable shortening | 622.7 |
| Salt | 321.7 |
| Glutamic acid | 5.1 |
| L-cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated at 300°F for 30 seconds. After cooling to 100°F, 0.12 part of diacetyl and 0.10 part of hexanal are added. After aging the resulting mixture for 3 hours, 0.1 part of 2,4,6-trimethyldihydro-1,3,5-dithiazine is added.

The resulting mixture is aged for 10 hours to provide a material having an excellent chicken aroma.

EXAMPLE II

The following ingredients are homogeneously mixed at 25°C:

| INGREDIENTS | PARTS |
|---|---|
| Vegetable shortening | 622.7 |
| Salt | 321.7 |
| Glutamic Acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated to 300°F for 30 seconds. After cooling to 100°F, 0.12 part of diacetyl, 0.10 part of hexanal, and 0.1 part of 2,4,5,6-tetramethyl-dihydro-1,3,5-dithiazine are added.

The resulting mixture has an excellent chicken aroma.

EXAMPLE III

Cysteine hydrochloride in the amount of 8.8 g is refluxed at 215°F under atmospheric pressure for four hours with a mixture of 309 g of hydrolyzed vegetable protein and 674 g of water. Subsequent to the reflux, the mixture is cooled and 0.05 g of 2,4,6-trimethyldihydro-1,3,5-dithiazine is added and intimately admixed with the composition. The mixture has an excellent beef flavor.

EXAMPLE IV

The composition prepared in Example I is dissolved in propylene glycol to provide a 0.1% solution. This solution in the amount of 0.966 g is added to 7.3 g of a soup base consisting of:

| INGREDIENTS | PARTS |
| --- | --- |
| Fine ground sodium chloride | 35.62 |
| Hydrolyzed vegetable protein | 27.40 |
| Monosodium glutamate | 17.81 |
| Sucrose | 10.96 |
| Beef fat | 5.48 |
| Sethness caramel color (powder B&C) | 2.73 |

The resulting mixture is added to 12 ounces of boiling water to obtain a soup having an excellent chicken flavor.

EXAMPLE V

The composition prepared in Example III is dissolved in propylene glycol to provide a 0.1% solution. This solution in the amount of 0.966 g is added to 7.3 g of a soup base consisting of:

| INGREDIENTS | PARTS |
| --- | --- |
| Fine ground sodium chloride | 35.62 |
| Hydrolyzed vegetable protein (Maggi 4BE) | 27.40 |
| Monosodium glutamate | 17.81 |
| Sucrose | 10.96 |
| Beef fat | 5.48 |
| Caramel color, bakers and confectioner's powder grade | 2.73 |

The resulting mixture is added to 12 ounces of boiling water to obtain a soup having an excellent beef flavor.

EXAMPLE VI

One-half gram of the soup base mixture of Example IV is emulsified in a solution containing 100 g gum arabic and 300 g water. The emulsion is spray-dried with a Bowen Lab Model Drier utilizing 250 cfm of air with an inlet temperature of 500°F, an outlet temperature of 200°F, and a wheel speed of 50,000 rpm.

Twelve grams of the spray-dried material is mixed with 29.2 g of the soup base set forth in Example IV. The resulting mixture is then added to 12 ounces of boiling water and an excellent meat flavored soup is obtained.

EXAMPLE VII

40 Pounds of ground round lean beef is slurried in 5 gallons of distilled water and placed in a 20 gallon steam jacketed doubly stirred stainless steel pressure reaction vessel. The vessel is sealed, heated to 182°C and held at this temperature for a period of 15 minutes. The maximum pressure attained is 90 psig. The vessel is cooled by passing water through the jacket. The vessel is then opened and the contents are steam distilled at atmospheric pressure. Two gallons of distillate are recovered. The residue is recharged with 2 gallons of fresh distilled water and the atmospheric steam distillation operation is repeated. This procedure is repeated four more times so that a total of 12 gallons of steam distillate is obtained. This material is then stored at 5°C in covered buckets until extraction.

Extraction is performed in a continuous fashion with distilled diethyl ether using approximately 22 liter portions of aqueous distillate. The ether extracts total 2.5 liters. They are combind, dried over anhydrous $NA_2SO_4$ and concentrated in a Kuderna-danish evaporative concentrator to a volume of approximately 5 ml, which concentrate is now subjected to analysis. The extract is subjected to GLC analysis (525 feet × 0.03 inch Carbowax 20M capillary) yielding over 129 peaks. GLC peaks 79–95 are set forth in FIG. 1. Peak 87 is analyzed by mass spectral analysis, and knowing its GLC retention index, it is confirmed to be furfuryl alcohol.

In an attempt to obtain additional information on the major peak immediately following furfuryl alcohol in the total beef extract, this extract is resubjected to GLC/MS on the 525 feet × 0.03 inch Carbowax 20M capillary. Scan 88 is on the peak in question. The fragmentation indicates a parent ion at 163 with probably two sulfur atoms and major fragments at 103 with one sulfur atom, 71 and 70, 60 and 59 with a base peak at 44. Minor fragments are observed at 82/88/85/64/54/45/42/34 and 32. All previous GLC/MS runs on either the total beef extract or traps of this particular area yield uninterpretable mass spectra on this peak with no discernable parent ion or fragmentation. Attempts are now made to trap this peak for further data. All traps are made on a 20 feet × ⅛ inch 10% Carbowax 20M stainless steel column with a 10:1 splitter. One trap is run on a high resolution mass-spectrometer, but the sample decomposes in the probe. One sample decomposes in the liquid injector of a Hitachi RMU6E mass spectrometer. One trap is run on NMR analyser over a period of 72 hours. It shows a quartet at 3.63/3.56/3.49/3.42 ppm, a multiplet at 3.02 (major peak), and a quartet at 0.82/0.79/0.76/0.73 ppm. Based on this data, the following structure is postulated:

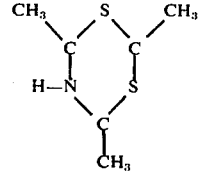

Figure 2:
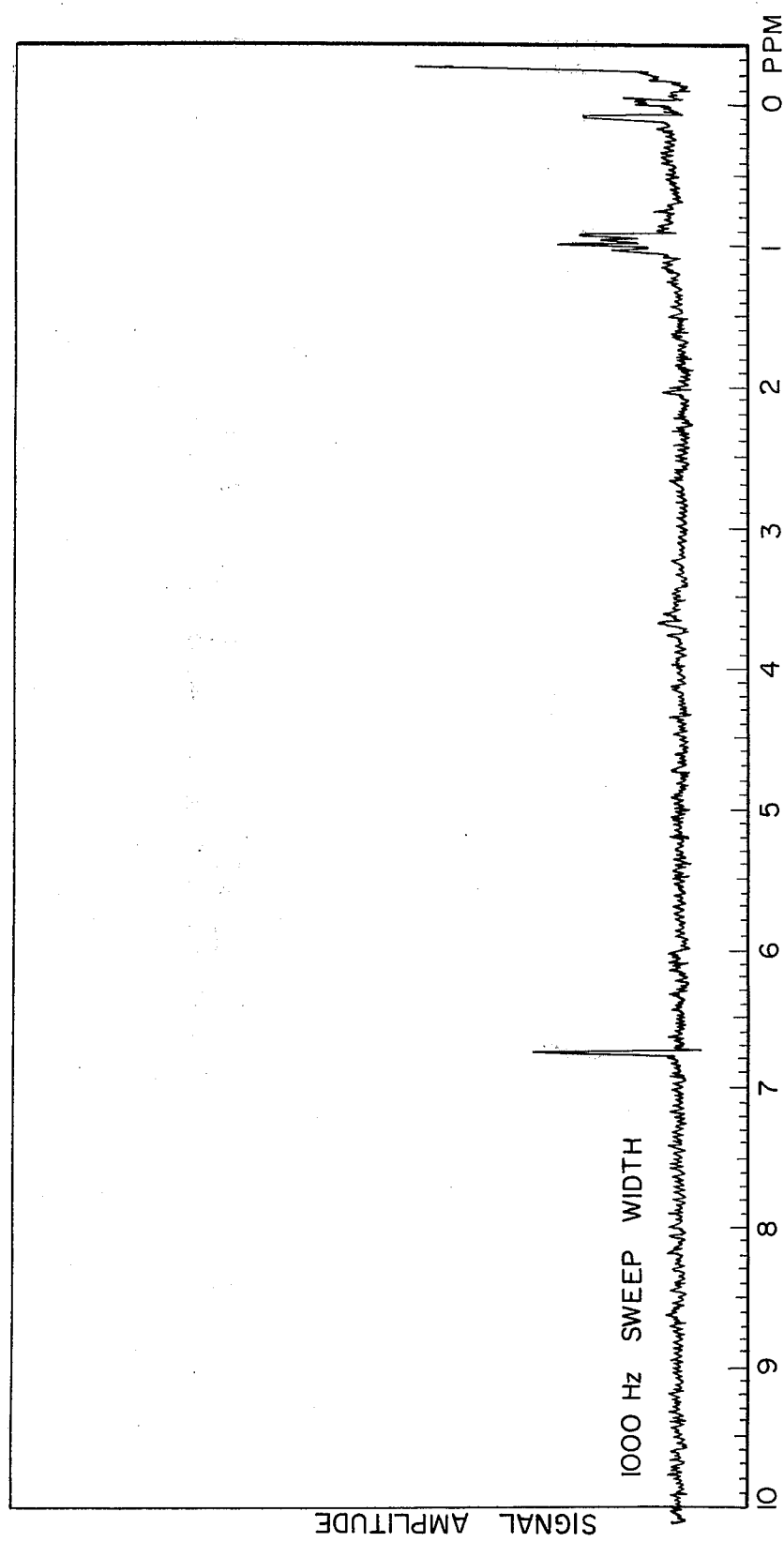
Figure 3:
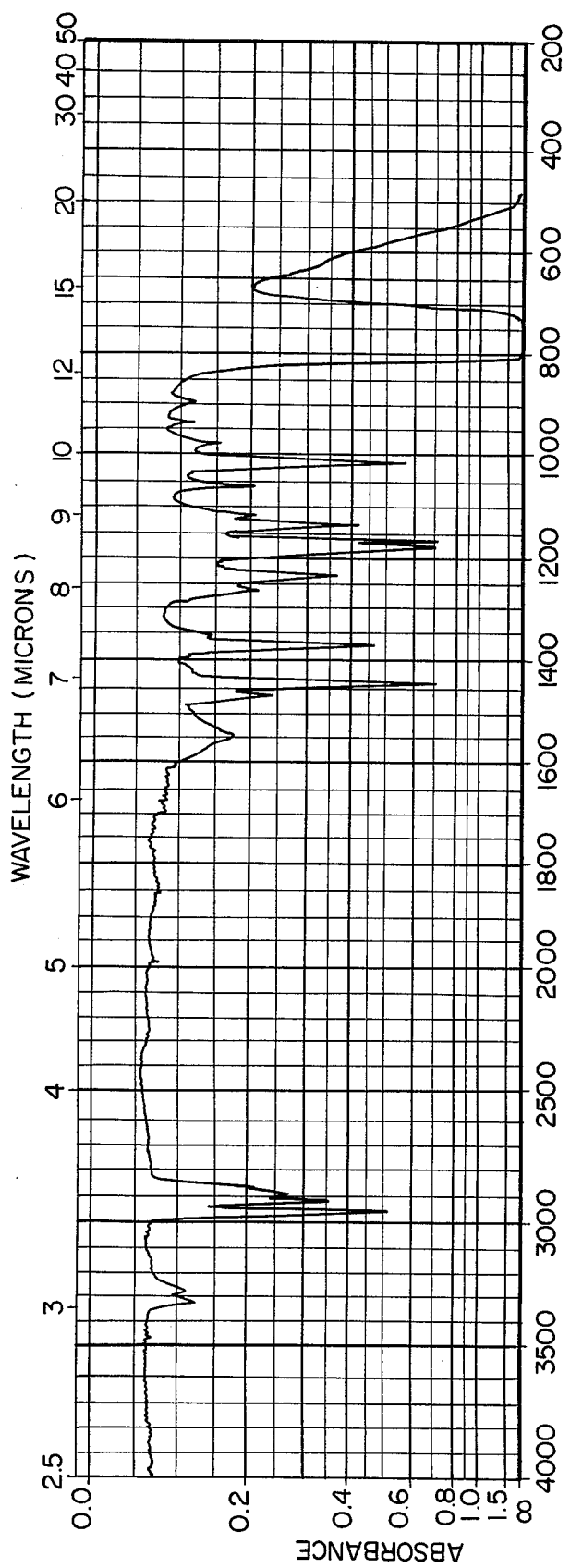
Figure 4:
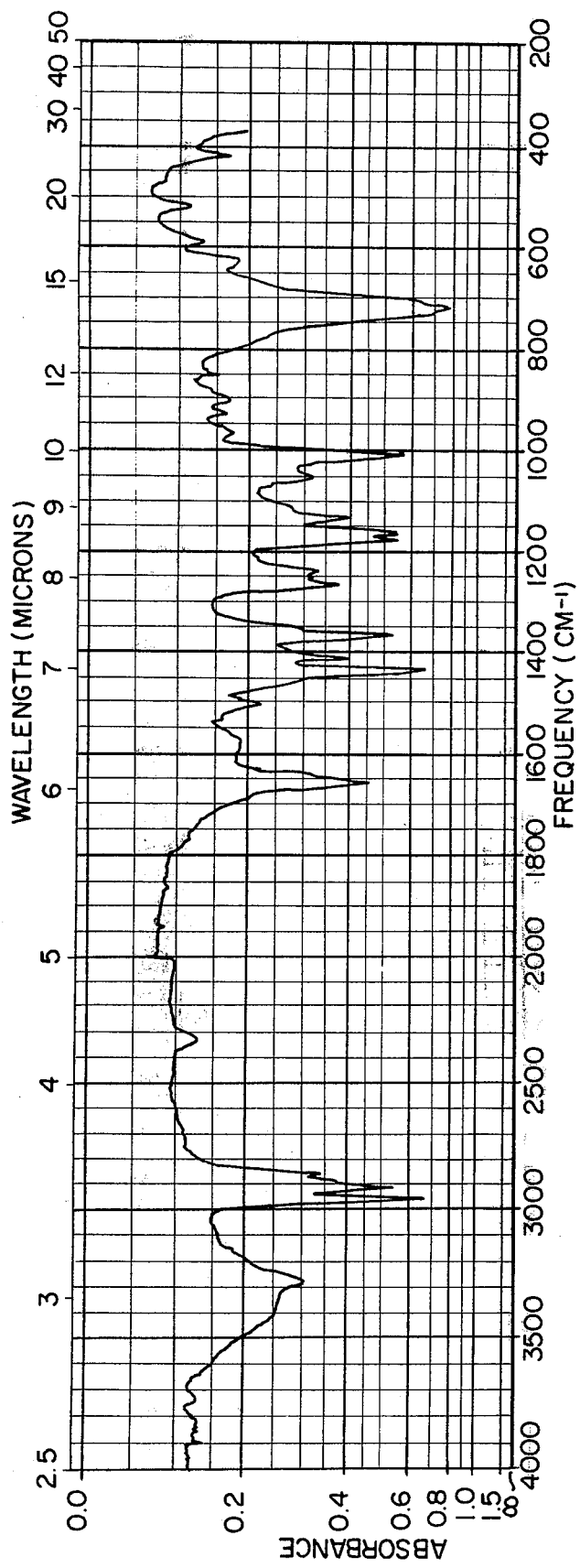

This material was previously synthesized in the prior art by reacting acetaldehyde, ammonia and $H_2S$. The following synthesis is run:

132 grams of acetaldehyde (3 moles) is added dropwise to approximately 360 ml of concentrated (28–30%) $NH_4OH$ (3 moles) with stirring in a 2 liter round-bottom flask equipped with a gas dispersion tube, a 250 ml addition funnel, a mechanical stirrer, a water-chilled reflux condenser (with outlet via a gas bubbler to the hood sink) and an immersion thermometer. The reaction vessel is cooled to −10°C with an ice-salt mixture. The addition takes approximately 2 hours. When addition is completed, H₂S gas is bubbled through the reaction mixture at a moderate rate with stirring, still maintaining the temperature in the range of from −5° to −10°C. After about 20 minutes, a white crystalline mass forms. Addition is continued for approximately 2 hours more, after which time the solid is quickly filtered through paper and a chilled filter funnel using a water aspirator vacuum. The filtrate is discarded and the crystalline precipitate is purified by recrystallization 3 times from the minimum amount of water necessary to dissolve it when warmed to approximately 60°C. No attempt is made to determine yield at this time. The only way a mass spectrum could be obtained on this material without having it decompose is to dissolve it in ethanol and run a GLC/MS analysis thereon. By employing this method, a mass spectrum which is superimposable with that described for the material trapped from the extract is obtained. NMR analysis with the same chemical shifts (as in the material trapped from the extract) is also obtained on the synthetic material. The NMR spectrum is set forth in FIG. 2. IR analysis is also obtained on the synthetic material as well as on the material trapped from the extract, and the IR spectra are superimposable. The IR analysis for the synthetic material is set forth in FIG. 3 and the IR analysis for the peak 88 of the beef extract is set forth in FIG. 4.

What is claimed is:

1. A process for augmenting or enhancing the chicken flavor or aroma of a foodstuff which comprises adding to said foodstuff from about 0.02 up to 100 parts per million by weight of a compound having the structure:

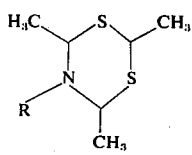

wherein R is hydrogen or methyl.

2. A composition useful in augmenting or enhancing the chicken aroma or taste of a foodstuff comprising (1) from about 0.1 up to about 90% by weight of a compound having the structure:

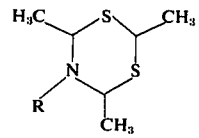

wherein R is hydrogen or methyl; and (ii) the balance being a member selected from the group consisting of (a) an adjuvant selected from the group consisting of: cyclopentane thiol, hydrolyzed vegetable protein, cysteine, cysteine hydrochloride, thiamine, 2,5-dimethyl-3-hydroxy-4-oxo-4,5-dihydrofuran and the 2–10 atmosphere reaction product of hydrogen sulfide and 2,5-dimethyl-3-hydroxy-4-oxo-4,5-dihydrofuran; and (b) an edible carrier compatible with said adjuvant and said compound having the formula:

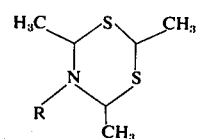

mixtures thereof.

3. The process of claim 1 wherein R is hydrogen.
4. The process of claim 1 wherein R is methyl.
5. The composition of claim 2 wherein R is hydrogen.
6. The composition of claim 2 wherein R is methyl.

* * * * *

UNITED STATES PATENT AND TRADEMARK OFFICE
CERTIFICATE OF CORRECTION

PATENT NO. : 3,966,988
DATED : June 29, 1976
INVENTOR(S) : Richard Arnold Wilson, et al It is certified that error appears in the above-identified patent and that said Letters Patent are hereby corrected as shown below:

Column 8, Line 14, "NA$_2$" should read --- Na$_2$ ---

Signed and Sealed this

Twenty-sixth Day of October 1976

[SEAL]

Attest:

RUTH C. MASON
*Attesting Officer*

C. MARSHALL DANN
*Commissioner of Patents and Trademarks*